United States Patent [19]

Egan

[11] 4,210,187
[45] Jul. 1, 1980

[54] PNEUMATIC TIRE HAVING SELF-SEALING FEATURE

[75] Inventor: William E. Egan, Tallmadge, Ohio

[73] Assignee: The Goodyear Tire & Rubber Company, Arkon, Ohio

[21] Appl. No.: 915,423

[22] Filed: Jun. 14, 1978

[51] Int. Cl.² .......................... B60C 5/14; B60C 17/00
[52] U.S. Cl. ..................................... 152/347; 106/33; 152/374; 156/115; 428/912
[58] Field of Search ............. 152/152, 330 RF, 330 L, 152/346, 347, 348, 374; 156/110 R, 115; 428/912, 159, 160, 305-307, 311, 315, 316; 106/33

[56] References Cited

U.S. PATENT DOCUMENTS

| | | | |
|---|---|---|---|
| 611,594 | 9/1898 | Kempshall | 152/347 |
| 706,590 | 8/1902 | Osgood et al. | 152/347 |
| 2,765,018 | 10/1956 | Connell | 152/347 |
| 2,827,098 | 3/1958 | Semegen et al. | 152/347 |
| 2,877,819 | 3/1959 | Gibbs | 152/347 |
| 3,022,810 | 2/1962 | Lambe | 152/157 |
| 3,081,276 | 3/1963 | Snyder et al. | 260/33.6 |
| 3,100,518 | 8/1963 | Dresser | 152/347 |
| 3,381,735 | 5/1968 | Talcott et al. | 152/313 |
| 3,712,360 | 1/1973 | Torti et al. | 152/354 |
| 3,794,706 | 2/1974 | Christie et al. | 156/115 |
| 3,903,947 | 9/1975 | Emerson | 152/347 |
| 3,952,787 | 4/1976 | Okado et al. | 152/347 |
| 4,037,636 | 7/1977 | Hagenbohmer et al. | 152/347 |
| 4,163,467 | 8/1979 | Dobson | 152/347 |

FOREIGN PATENT DOCUMENTS

| | | | |
|---|---|---|---|
| 1382994 | 11/1964 | France | 152/347 |
| 118361 | 3/1926 | Switzerland | 152/347 |
| 12974 | of 1891 | United Kingdom | 152/347 |
| 672372 | 5/1952 | United Kingdom | 152/347 |

*Primary Examiner*—John E. Kittle
*Attorney, Agent, or Firm*—H. C. Young, Jr.

[57] ABSTRACT

Self-sealing pneumatic tire having a oil treated, integral, thin, covulcanized, resilient, rubber, closed cell structure on its inner surface in which the vulcanized rubber of said closed cell structure contains compounded rubber processing oil and, in its vulcanized state, is further treated to absorb an additional non-volatile oil.

12 Claims, 2 Drawing Figures

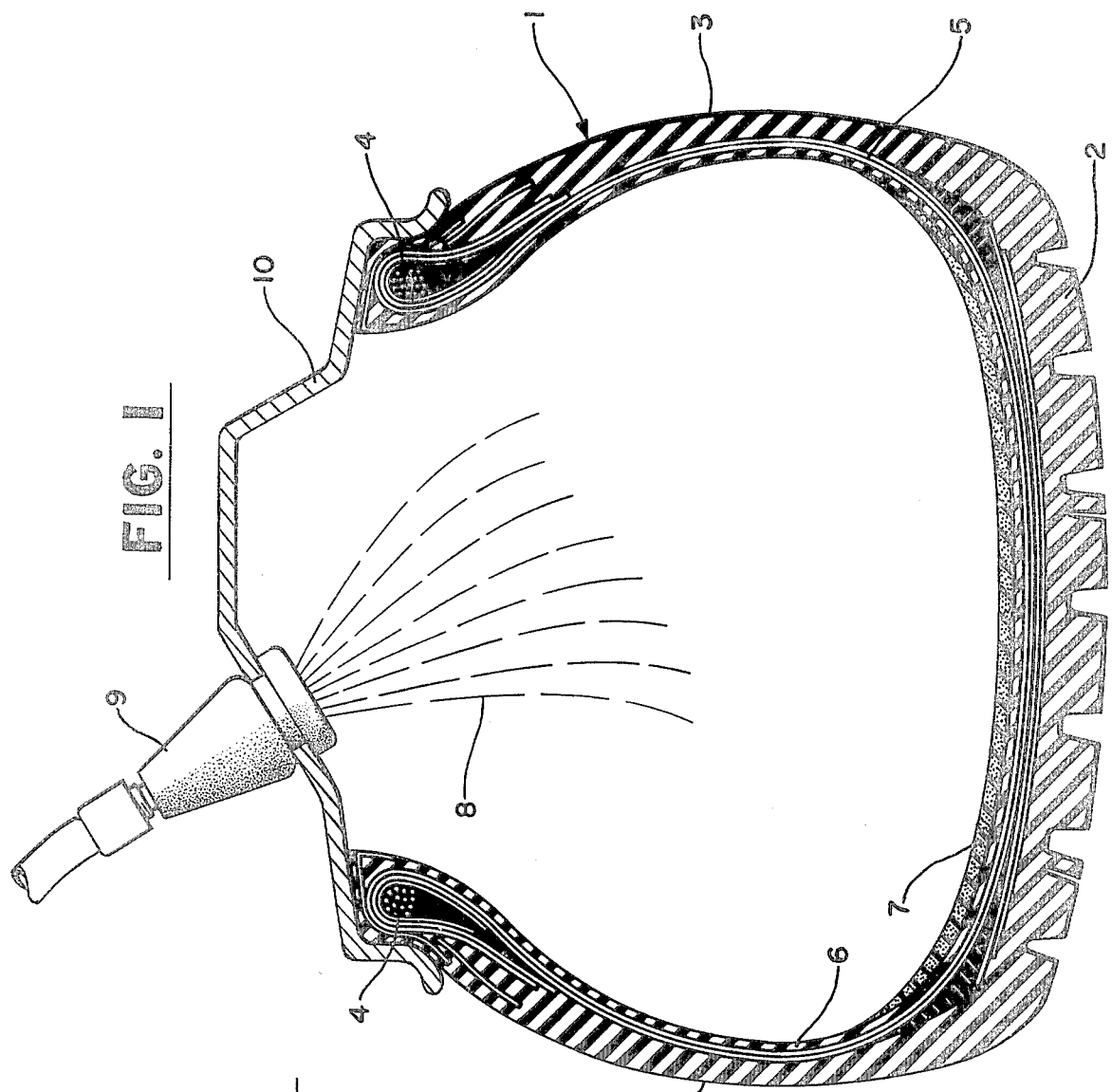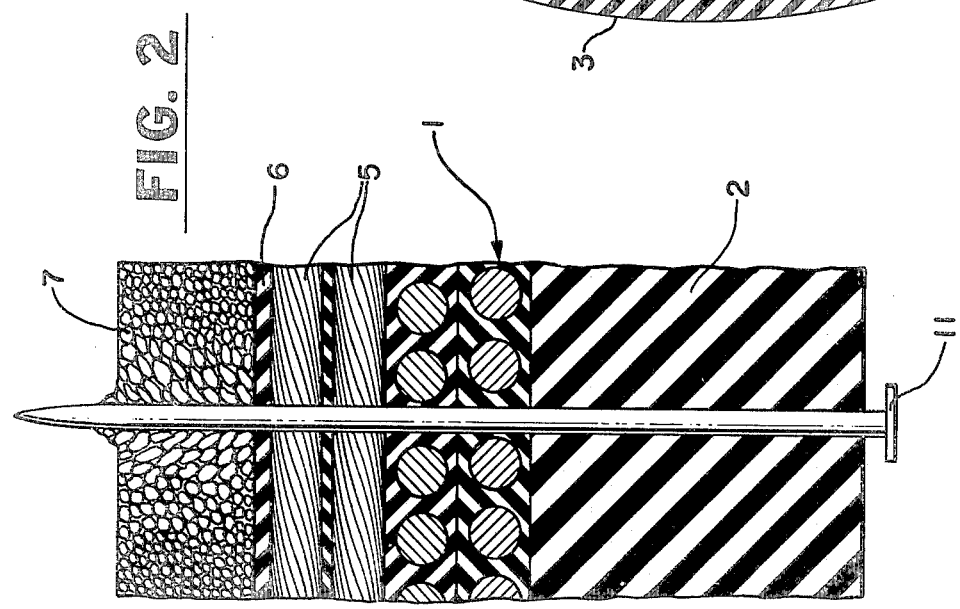

PNEUMATIC TIRE HAVING SELF-SEALING FEATURE

This invention relates to a self-sealing pneumatic tire. This invention more specifically relates to a pneumatic tire having an ability to seal against puncturing objects.

For safety, pneumatic tires have been historically sought which have a means of retarding or preventing their deflation upon being punctured. Many methods and tire constructions have been suggested and used for this purpose, mostly without significant commercial success for conventional passenger vehicles such as automobiles which are to be driven over typical roadways. Fluid puncture sealants which seal by flowing into the puncture hole have not been entirely successful because they may tend to cause the tire to become out of balance or tend to have varying flow properties over a wide temperature range. Central cores of cellular material which will physically maintain the tire shape when punctured have been suggested. However, such cores place a serious restriction on the vehicular maximum speed or endurance due to degradation of the core. Although success has been achieved with an inner, integral, covulcanized, thin, resilient, closed cell structure, some improvements are still desired.

It is, therefore, an object of this invention to provide a self-sealing pneumatic tire which has an ability to seal against puncturing objects.

In accordance with this invention, a self-sealing pneumatic tire has been discovered which comprises a pneumatic cured rubber tire having an integral, thin gauge, covulcanized, resilient, rubber, closed cell structure, disposed in its inner portion, in which the vulcanized rubber of said closed cell structure contains about 2 to about 60 phr compounded rubber processing oil and in its vulcanized state, is treated to adsorb about 25 to 150, preferably about 30 to about 100, phr of a non-volatile oil compatible therewith. Generally, it is considered that the vulcanized rubber is about 60 to about 100, preferably about 90 to about 100, percent saturated with said oil with reference to 25° C.

Thus, in further accordance with this invention, a puncture-sealing pneumatic rubber tire is provided having two spaced inextensible beads, a ground contacting tread portion, a pair of individual sidewalls extending radially from the axial outer edges of said tread portion to join the respective beads, a supporting carcass structure for said tread portion and sidewalls generally extending from bead to bead and, as a puncture sealing feature, an integral, thin gauge, covulcanized, resilient rubber closed cell structure disposed inwardly of said supporting structure where the vulcanized rubber of said closed cell structure is treated with and has adsorbed said rubber processing-type oil compatible therewith. It is generally desired that the oil is absorbed to the extent that the vulcanized rubber is about 60 to about 100, preferably about 90 to about 100, percent saturated therewith at a reference temperature of 25° C.

The invention relies upon the discovery that the cooperative combination of oil treating the integral, thin gauge, covulcanized, resilient closed cell structure enhances the puncture sealing ability of the cell structure, particularly where said cells have a greater than atmospheric internal pressure.

Therefore, the oil treated, resilient closed cell structure is required to be an integral dynamic part of the tire.

Optionally, and generally not preferred, unless it might be necessary in some instances in order to prevent excessive migration or absorption of the applied oil into the main tire carcass, an oil barrier layer can be used as an interface between said oil treated closed cell structure and said reinforcing carcass.

It is important to appreciate that the amount of compatible oil necessary for the accomplishment of this invention is considered too great to be incorporated into the rubber by conventional means. In other words, if the amount of oil necessary were to be initially mixed with the uncured rubber, the resulting compounded rubber would present excessive processing difficulties because of its softness, stickiness or tackiness and lower viscosity and green strength. As a result, the rubber would be difficult to mix, extrude, calendar and, when shaped, would not reasonably maintain its thickness, gauge, size or contour.

In the practice of this invention, a sufficient amount of oil is added to the inside surface of the closed cell structure to saturate it in the sense that virtually no more free oil would be observed on its outer surface and, preferably, that little or no more oil could be absorbed into the rubber itself. In this sense, it is intended that the rubber of the closed cell structure be about 60 to about 100 and preferably about 90 to about 100 percent saturated, after the oil has absorbed or has been imbibed into the rubber itself.

As an optionally desired feature of this invention, it is preferred that the processing oil to be used for treating the vulcanized rubber have the properties of being compatible with the vulcanized rubber of the closed cell structure, yet somewhat incompatible with the carcass vulcanized rubber with which the closed cell structure is integral. In this sense, it is desired that the processing oil to be used to treat the vulcanized rubber of the closed cell structure be compatible therewith as characterized by a swell increase in the range of about 30 to about 180, preferably about 50 to about 150, percent and that it be relatively incompatible with the said carcass vulcanized rubber as characterized by a swell increase in the range of about zero to about 10, preferably about zero to about 5, percent, according to ASTM #D-471.

In the practice of this invention, a typical amount of rubber processing oil mixed to the unvulcanized rubber compound is in the range of about 2 to about 60 parts by weight oil per 100 parts by weight rubber (phr). In the practice of this invention, an additional 25 to about 150 phr rubber processing oil is added to and absorbed into the vulcanized rubber of the closed cell structure.

The oil applied to the inside surface of the vulcanized closed cell structure is imbibed or absorbed into its rubber over a period of time depending primarily upon the temperature and frequency of use and the cyclic rate revolution of the tire. Therefore, at least for a period of time, there tends to be free oil until it is absorbed.

The oil treatment itself is accomplished by adding the oil to the inside, exposed, closed cell surface of the vulcanized tire, typically after the tire is already mounted upon a centered rigid wheel. Thus, the oil can be applied through a valve stem of a mounted, deflated, pneumatic rubber tire.

Various oils which are compatible with rubber can be used. They can generally be referred to as rubber processing oils. Representative of such oils are paraffinic, naphthenic, aromatic, pine tar and synthetic oils, which oils are compatible with the polymer of the closed cell structure.

The rubber processing oils used in this invention are also known in the art as "rubber extending oils" and "compatible rubber processing oils." These terms refer to oils that are miscible in the vulcanized rubber. It is the type of oil that can also characteristically and conventionally be mixed, or compounded, with uncured rubber, as an extender, along with other ingredients, following which the compounded rubber is shaped and cured.

In the practice of this invention, the oil is allowed to imbibe into the cured rubber of the integral, closed cell structure on the inside of the pneumatic tire in order to enhance its puncture sealing feature.

The natural and synthetic rubber processing oils are normally derived from petroleum, although they can also be derived from coal tar and other sources, such as rosin oils. Representative processing oils are more fully described in U.S. Pat. No. 3,081,276. The processing oils are usually composed primarily of paraffinic hydrocarbons, naphthenic hydrocarbons and aromatic hydrocarbons. Such oils are well-known commercial oils normally used in rubber compounding which are generally high boiling petroleum fractions obtained after gasoline, fuel oil and other lower boiling materials are removed by distillation. An example of synthetic oil are the polybutenes prepared by the polymerization of isobutylene. The oils normally have a viscosity of from about 10 centipoises (cps) at 100° C. up to about 1000 cps, although they preferably have such a viscosity in the range of about 20 to about 500 cps. They usually have a boiling point of from about 50° C. to at least about 200° C. and higher, although preferably about 100° C. to about 300° C. For example, many processing oils have a boiling point of at least about 245° C. at 10 millimeters of mercury. They normally have a specific gravity (60/60° F.) of from about 0.9 to about 1.05.

Therefore, the compatible oil is not a coating in the usual sense because it is actually accepted imbibing or absorbing into the vulcanized rubber. As a result, some of the gas-containing cells of the closed cell structure may also contain some of the oil and thus contain both oil and gas.

It is required that the oil is compatible with the closed cell polymer structure in the sense that it is soluble in the polymer to the extent that the polymer imbibes the oil, typically causing the polymer to visually swell somewhat.

In these regards, a butyl, chlorobutyl or bromobutyl rubber may be particularly suitable for the closed cell structure since the rubber processing oil is compatible with and both softens the cured butyl rubber and makes it tacky.

The invention is uniquely operable as a pneumatic tire construction for typical vehicular speeds, such as at least up to about 70 and typically up to at least 100 miles per hour (mph). Indeed, pneumatic tires can be prepared with such an oil-treated internal cell structure for vehicular speeds in excess of 200 miles per hour.

The oil treated integral thin gauge closed cell structure can be disposed in various inner portions of the tire where it is desired to guard against punctures. For example, it can typically extend from bead to bead for protection of both the tread and sidewall portions of the tire or it can simply be selectively and locally disposed only inwardly of the tread portion for protection against punctures occurring through the tread.

It is required that the inner cellular structure is covulcanized with the tire in order to be integral with the dynamic tire construction. It is built as a solid unvulcanized layer containing a heat activatable blowing agent onto the inner portion of the green, unvulcanized tire over a building form and then shaped, molded and heated under pressure to simultaneously covulcanize therewith. The pressure is generally supplied by a shaping bladder positioned within the tire to press and shape it outwardly against a mold. The closed cell structure is formed by heat activating said blowing agent during the vulcanization process to practically simultaneously expand said adherent solid layer. Typical vulcanization temperatures range from about 90° C. to about 200° C. Thus, it is required that the cell structure is formed substantially simultaneously with the covulcanization step to enhance the integral tire construction. The cell structure itself is therefore integral with the tire construction, instead of being a simple laminate.

In the practice of this invention, the manipulation of the preparation steps require that a blowing agent be activated within a solid rubbery layer of the tire during its heating, shaping and vulcanization step. The confined cellular structure remains in a compressed state until the vulcanization step is essentially complete. Upon removal from the mold, with the attendant release of mold pressure, the structure normally expands somewhat.

The integral cell structure of the tire is thin without occupying any substantial inner volume of the tire. Generally, its thickness is such that, in its neutral state, is in the range of from about 0.05 to about 0.7 (0.13–1.8) and preferably about 0.12 to about 0.3 (0.3–0.8), with a more general range being about 0.1 to about 0.5 (0.3–1.3) inch (cm). The desired thickness depends somewhat upon the tire size and its intended use, commensurate with puncture sealing ability. For example, the tires can range from a small industrial or utility vehicle size through an intermediate higher speed passenger automobile tire to a larger truck or off-the-road vehicle size.

The neutral-state thickness of the structure is its thickness in its oil-treated, pressure equilibrated, state. The structure is considered pressure equilibrated when its internal cell pressure is at least about 80 percent of the internal tire (inflation) pressure or atmospheric pressure the tire is not inflated.

The thin gauge cell structure is required to be resilient in order to effectively seal against a puncturing object or to close a puncture. The resilient closed cell structure seals by compressing against puncturing objects and by expanding to fill a puncture. Its resiliency is generally somewhat dependent upon the modulus or hardness of its elastomeric composition, internal cell pressure and cell size. The resiliency can be characterized by having a compressability in the range of about 1 to about 800 pounds per square inch (psi) and preferably about 1 to about 100 psi at 50 percent compression at 25° C.

The cured cell structure typically has a loaded specific gravity equal to about 0.15 to about 0.95, preferably about 0.25 to about 0.8. The term loaded specific gravity relates to the cured cellular material, such as rubber, being loaded with pigments and fillers such as carbon black, silica, zinc oxide, oils and blowing and curing agents.

The amount of internal gaseous cell pressure desired is dependent upon the degree of self-sealing ability desired in combination with the resiliency of the cell structure. It should be readily appreciated by those having skill in the tire art that the actual internal cell pressure is typically in a constant state of transition. Because of the natural ability of the gases such as air and nitrogen as well as others to diffuse through rubber and other typical tire building polymers, the internal cell pressure tends to seek the actual tire inflation pressure. Tire inflation pressure can vary somewhat over a period of time and can vary with temperature change. It is well recognized that pneumatic tires can have a wide range of inflation pressures such as from about 5 psig to about 300 psig, depending somewhat upon their construction and intended use. For example, a passenger car tire can have an intended inflation pressure in the range of about 22 to about 35 and, sometimes, even up to about 50 psig. Therefore, although it is important that the cells have an internal pressure greater than atmospheric, such as at least about 3 psig, an actual desired internal cell pressure is dependent upon the degree of self-sealing ability desired and the tire inflation pressure.

The tire of this invention can self-seal against various puncturing objects depending somewhat upon the resiliency, thickness and internal pressure of the closed cell structure, but more importantly, upon the oil treatment to make the cell structure more tacky and pliable.

Typically, the tire can self-seal punctures caused by nails and objects of various sizes, such as nails preferably at least up to diameters of 0.25 inch (one cm).

The vulcanized rubber tire and the covulcanized integral closed cell inner structure can be of various cured or vulcanized rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers.

Typically, the various polymers are cured or vulcanized by normal curing methods and recipes such as with sulfur, or with peroxides in the case of the ethylene-propylene copolymers, or with primary diamines in the case of polyurethane elastomers.

The sulfur cured or vulcanized natural rubber and synthetic rubbery polymers are preferred such as butadiene-styrene rubber, cis-1,4-polyisoprene, polybutadiene, butyl rubber, chlorobutyl rubber and bromobutyl rubber. It is sometimes preferred and even required that a cured rubber/oil combination choice is made so that the oil is compatible with the cured rubber of the closed cell structure and incompatible with the liner or carcass rubber. In this regard, it is usually desirable to use one of the butyl or halobutyl rubbers for the closed cell structure and one of the other rubbers or rubber blends for the liner or carcass rubber.

The blowing agents used in the practice of this invention for the manufacture of the pneumatic tire are those which liberate gases such as, for example, nitrogen and carbon dioxide. Ammonium bicarbonate and sodium bicarbonate can liberate carbon dioxide and cause the formation of the integral closed cell internal layer. Usually agents which liberate nitrogen at a temperature near or in the range of the vulcanization of curing temperature are preferred, such as about 100° C. to about 180° C., although they can generally suitably liberate the nitrogen at temperatures ranging from 10° C. to 20° C. below vulcanization temperatures. Such blowing agents are compounds which give off gases upon being triggered by the vulcanization temperatures, representative of which are nitro, sulfonyl and azo compounds such as dinitroso-pentamethylene tetramine, N,N'-dimethyl-N,N'-dinitrosophthalimide, azodicarbonamide, sulfonyl hydrazides such as benzenesulfonyl hydrazide, toluenesulfonyl hydrazide and p,p'-oxy-bis-(benzenesulfonyl)hydrazide and sulfonyl semicarbazides such as p-toluene sulfonyl semicarbazide and p,p'-oxy-bis(benzenesulfonyl semicarbazide).

After covulcanization, the tire is removed from the mold, usually with some attendant expansion, usually to a small degree, of the closed cellular structure.

The inside exposed surface of the cell structure on the inside of the tire is treated with the oil. The oil treatment can be accomplished while the tire is hot, such as about 100° C. to 150° C., soon after it is removed from the mold, or at ambient temperatures in the range of about 20° C. to about 50° C. The treatment itself can be accomplished by spraying, pouring or brushing the oil onto the cell structure surface. Preferably, the cell structure is oil-treated when the tire is mounted on a central, rigid rim. The tire is then desirably rotated around its axis to aid in providing an even distribution of the oil. Although the time will vary to accomplish an effective imbibing, soaking or absorption of the oil into the structure, depending somewhat upon temperature, the oil, cell structure and tire size, usually about 1 to about 96 hours, is sufficient.

If desired, the tire can be mounted on a rim and inflated before application of the oil treatment. In this case, the oil can be applied by inserting through valve stem. Usually the mounted tire is deflated for this operation, after having been mounted on the rim and inflated to seat the tire on the rim.

The invention will be more readily understood with respect to the accompanying drawings wherein:

FIG. 1 is a cross-sectional view of a shaped, molded and cured pneumatic tire having an oil treated, integral, thin gauge, covulcanized resilient rubber closed cell structure on its inner surface; and FIG. 2 is an enlarged cross-sectional view of the tire of FIG. 1 at its tread portion illustrating the effective closure or sealing of the puncture by said oil-treated, closed cell construction.

More specifically, in the drawings, it is shown that a pneumatic rubber tire can be prepared by building, shaping and covulcanizing basic tire construction 1 containing its customary tread portion 2, sidewalls 3, beads 4, and carcass support member 5, which typically contains plies to back and reinforce the tread and sidewall portions, an air barrier layer 6, and particularly an integral, thin, covulcanized, resilient rubber closed cell foam structure on its inner surface. The tire is prepared by placing a cylindrically shaped tire construction in a mold where it is shaped, molded and heated under pressure to essentially simultaneously covulcanize the tire and solid, inner, compounded layer and also activate a blowing agent contained in the compounded layer to form a pneumatic tire 1 containing the integral, thin gauge, covulcanized, resilient rubber closed cell foam structure 7 on its inner surface.

An oil 8 compatible with the cured rubber of the closed cell structure 7 is applied to the inside, exposed surface of the closed cell structure 7 through a valve stem 9 after the tire is mounted on a rim 10, inflated to seat the tire, and then deflated. After reinflation, the tire is rotated at a speed of about 60 rpm for about 10 hours to allow the oil to imbibe into the cell structure. Alternate methods of applying the oil to the inside of the tire may be used, if desired.

With further reference to the figures, particularly FIG. 2, the practice of this invention is more clearly depicted by showing the actual puncturing of the pneumatic tire 1 with a nail 11 and the automatic sealing of the tire by the resilient cell structure as its cell walls compress against the nail. The internal pressure of the resilient cell structure causes the oil softened-internally tacky, cell walls to expand into the area of the punctured cells and seal around the nail. If the nail were removed, the cells, with their tacky inner walls would expand to seal the hold. If the hole is not fully sealed, deflation of the tire, with its accompanying reduction of air pressure and increase of pressure differential across the cell walls actuates further cell wall expansion and effects the sealing of the puncture.

It should be understood that the self-sealing pneumatic tire of this invention, although it is depicted in FIG. 1 of the drawings as containing the oil treated, integral, closed cell structure on its inner surface opposite the tread portion, the cell structure can also extend over virtually all or a major portion of the inside surface of the tire, even bead-to-bead, to include the portion in the region of at least one of its sidewalls.

The practice of this invention is further illustrated by reference to the following example which is intended to be representative rather than restrictive of the scope of the invention. Unless otherwise indicated, all parts and percentages are by weight.

EXAMPLE 1

An unshaped and unvulcanized steel belted, polyester cord, bias-ply tire was first built around a 15-inch diameter drum by first building over the drum an inner layer of rubber having a thickness of about 0.2 inch (0.5 cm) with the general composition shown in Table 1:

Table 1

| Compound | Parts |
| --- | --- |
| Crude natural rubber | 20 |
| Polybutadiene rubber | 20 |
| Bromobutyl rubber | 60 |
| Stearic acid | 1 |
| Rubber processing oil | 10 |
| Resinous tackifier | 4 |
| Carbon black | 50 |
| Zinc oxide | 5 |
| Curative | 1.5 |
| Blowing agent[1] | 4 |

[1] a n-nitroso compound, heat activatable.

Over this initial layer of rubber, the remainder of the tire was built including the lay-up of the air barrier layer, rubberized fabric plies, belt, tread, sidewall and bead portions, as generally shown in FIG. 1 of the drawings.

The fabricated tire was removed from the building form and shaped, molded and vulcanized in a tire mold, or press, at a temperature of about 92°-100° C. to form a tire size HR 78-15. During the shaping step, the inner layer of specially compounded rubber stretched so that its thickness was reduced somewhat. During the vulcanization step, the blowing agent in the compounded rubber was heat activated to form an integral, resilient rubber, closed cell structure somewhat in a compressed form.

Upon removal from the mold, the closed cell structure expanded a small amount to a thickness of about 0.2 inch (0.5 cm) with an overall density of about 39-49 pounds per cubic foot (lb/ft$^3$).

The tire was mounted on a metal rim and inflated to a pressure of about 25-30 pounds per square inch (psi) to seat the tire on the rim. The tire was then deflated and its inflation valve core removed from the valve stem. Through the valve stem was charged a predetermined amount of a paraffinic/aromatic oil blend which was compatible with the closed cell rubber structure.

The tire was reinflated to a pressure of 26 psi (cold), or 30 psi (hot), and tested by running against a motor driven dynamometer at a speed of about 50 miles per hour (mph) under a load of 1285 pounds. Similarly, a control tire of the HR 78-15 type was also inflated and run against a dynamometer.

Both the experimental tire of this example and the control tire without either the closed cell structure on its inner surface nor the oil treatment were tested as follows by running against the dynamometer:

First, a 0.18 inch (0.05 cm) diameter nail was driven into a major groove of the treated surface of the tire and through the carcass in order to puncture the tire. Results of this nail test are thown in the following Table 2:

Table 2

| (Nail In) Original Hot Inflation Pressure - 30 psi | | |
| --- | --- | --- |
| | Miles | Air Loss (psi) |
| Experimental Tire | 10,300 | 16 |
| Control Tire | 460 | 16 |

An additional test was run by driving the 0.18 inch (0.05 cm) diameter nail into a major groove of the tread surface to puncture a tire of this example and a similar control tire of the HR 78-15 type. The nails were then removed or pulled from the two tires and the test run on the motor driven dynamometer at a tire speed of 50 mph under a load of 1285 pounds. The results are shown in the following Table 3:

Table 3

| (Nail Out) Original Inflation Pressure - 30 psi Hot | | |
| --- | --- | --- |
| | Miles | Air Loss (psi) |
| Experimental Tire | 26,000 | 16 |
| Control Tire | 60 | 16 |

In these tests, the results of which have been shown in Tables 2 and 3, the experimental and Control tires, were run until their air loss was 16 psi, which represents a 14 psi residual internal hot pressure which was used as the cut-off point in the tire test.

While certain representative embodiments and details have been shown for the purpose of illustrating the invention, it will be apparent to those skilled in this art that various changes and modifications may be made therein without departing from the spirit or scope of the invention.

What is claimed is:

1. A self-sealing pneumatic tire which comprises a pneumatic cured rubber tire having an integral, thin gauge, covulcanized, resilient, rubber, closed cell structure, said closed cells containing a gas, disposed as its inside surface, in which the vulcanized rubber of said closed cell structure originally contains about 2 to about 60 phr compounded rubber processing oil and which has been, in its vulcanized state, subsequently oil treated to adsorb an additional 25 to 150 phr of a non-volatile oil compatible therewith.

2. The tire of claim 1 where said vulcanized rubber of said closed cell structure is about 60 to about 100 percent saturated with said compounded and treatment oils with reference to 25° C.

3. The tire of claim 2 having two spaced inextensible beads, a ground contacting tread portion, a pair of individual sidewalls extending radially from the axial outer edges of said tread portion to join the respective beads, a supporting carcass structure for said tread portion and sidewalls generally extending from bead to bead and, as a puncture sealing feature, an integral, thin gauge, covulcanized, resilient rubber closed cell structure disposed inwardly of said supporting structure where the vulcanized rubber of said closed cell structure is treated with and has adsorbed said rubber processing-type oil compatible therewith as characterized by a swell increase of a sample of said vulcanized rubber in the range of about 30 to about 180 percent according to ASTM No. D-471.

4. The tire of claim 3 where the vulcanized closed cell structure is treated with an oil which is compatible therewith and relatively incompatible with the carcass rubber with which the closed cell structure is integral.

5. The tire of claim 4 where oil for treating the vulcanized rubber of the closed cell structure is compatible therewith as characterized by a swell increase in the range of about 30 to about 180 percent and is relatively incompatible with the said carcass vulcanized rubber as characterized by a swell increase in the range of about zero to about 10 percent, according to ASTM No. D-471.

6. The tire of claim 3 or 4 where said oil is a rubber processing oil selected from at least one of paraffinic, naphthenic, aromatic, pine tar, polybutenes and synthetic oils.

7. The tire of claim 5 where said oil has a viscosity in the range of about 10 to about 1000 cps at 100° C.

8. The tire of claim 3 where the closed cell structure is a vulcanized butyl, chlorobutyl or bromobutyl rubber.

9. The tire of claim 3 or 4 where the gaseous internal pressure of the closed cell structure is greater than atmospheric pressure.

10. The self-sealing pneumatic tire of claim 1 in which said closed cell structure is a part of its inner surface disposed at least opposite its tread portion, and has a neutral state, substantially pressure equilibrated, thickness in the range of about 0.1 to about 0.5 inch, where said closed cell structure is treated in its vulcanized state to absorb about 30 to about 100 phr of a rubber processing oil to the extent that it is about 60 to about 100 percent saturated with both of said compounded and treatment rubber processing oils wherein some of the closed cells optionally contain both oil and gas, where said rubber processing oil is selected from at least one of paraffinic, naphthenic, aromatic, pine tar, polybutenes and synthetic oils, and where said oil and closed cell structure are compatible as characterized by vulcanized rubber swell increase in the range of about 50 to about 150 percent and, optionally, said oil and portion of carcass interfacing with said closed cell structure are relatively incompatible as characterized by said carcass portion's swell increase in the range of about 0 to about 10 percent according to ASTM #D-471.

11. The tire of claim 10 where the closed cell structure is about 90 to about 100 percent saturated with said oil and where the rubber for said closed cell structure and said carcass, including said carcass inner facing portion, is selected from at least one of butyl, chlorobutyl, bromobutyl, natural, butadiene-styrene copolymers, butadiene-acrylonitrile copolymers, cis-1,4-polyisoprene, polybutadiene, and ethylene-propylene nonconjugated diene terpolymers.

12. The tire of claims 1, 3 or 7 where the closed cell structure is about 60 to about 100 percent saturated with said oil, where the rubber for said closed cell structure and said carcass, including its carcass inner facing portion, is selected from at least one of butyl, chlorobutyl, bromobutyl, natural, butadiene-styrene copolymers, butadiene-acrylonitrile copolymers, cis-1,4-polyisoprene, polybutadiene, and ethylene-propylene non-conjugated diene terpolymers, and where said oil is a rubber processing oil selected from at least one of paraffinic, naphthenic, aromatic, pine tar, polybutenes and synthetic oils.

* * * * *